United States Patent
Zheng et al.

(10) Patent No.: US 9,645,689 B2
(45) Date of Patent: May 9, 2017

(54) TOUCH SUBSTRATE AND DISPLAY DEVICE

(71) Applicants: BOE Technology Group Co., Ltd., Beijing (CN); Beijing BOE Optoelectronics Technology Co., Ltd., Beijing (CN)

(72) Inventors: Dan Zheng, Beijing (CN); Haibo Zhu, Beijing (CN); Linlin Lu, Beijing (CN); Jianmin Duan, Beijing (CN); Jingxian Jin, Beijing (CN); Hongyou Gong, Beijing (CN); Yulei Zhai, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/769,175

(22) PCT Filed: Nov. 21, 2014

(86) PCT No.: PCT/CN2014/091905
§ 371 (c)(1),
(2) Date: Aug. 20, 2015

(87) PCT Pub. No.: WO2016/004720
PCT Pub. Date: Jan. 14, 2016

(65) Prior Publication Data
US 2016/0252998 A1    Sep. 1, 2016

(30) Foreign Application Priority Data
Jul. 11, 2014   (CN) .......................... 2014 1 0332397

(51) Int. Cl.
*G06F 1/00*    (2006.01)
*G06F 3/044*    (2006.01)

(52) U.S. Cl.
CPC .................................. *G06F 3/044* (2013.01)

(58) Field of Classification Search
CPC ........ G09G 1/00; G09G 3/3233; G06F 3/044; G06F 2203/04103; G06F 3/0412; G06F 3/047
See application file for complete search history.

(56) References Cited

U.S. PATENT DOCUMENTS

| 2013/0335366 A1 | 12/2013 | Lee et al. | |
| 2015/0189711 A1* | 7/2015 | Horsky | H05B 33/083 |
| | | | 315/186 |
| 2015/0205428 A1* | 7/2015 | Wang | G06F 3/044 |
| | | | 345/174 |

FOREIGN PATENT DOCUMENTS

| CN | 102693041 A | 9/2012 |
| CN | 102955303 A | 3/2013 |

(Continued)

OTHER PUBLICATIONS

Apr. 24, 2015—International Search Report Appn PCT/CN2014/091905 with Eng Tran of Written Opinion.

(Continued)

*Primary Examiner* — Michael Faragalla
(74) *Attorney, Agent, or Firm* — Banner & Witcoff, Ltd.

(57) ABSTRACT

A touch substrate and a display device, comprising a plurality of first electrodes for touch control, a plurality of first switching units and a control unit for controlling the first switching units; any two adjacent the first electrodes are connected through one of the first switching units and each of the first electrodes is connected with the control unit. The touch substrate can avoid the problem that charges tend to accumulate on touch driving electrodes and/or touch sensing electrodes during a touch process and cannot be released well in a display phase.

18 Claims, 3 Drawing Sheets

(56) References Cited

FOREIGN PATENT DOCUMENTS

| CN | 202904521 U | 4/2013 |
|---|---|---|
| CN | 103268175 A | 8/2013 |
| CN | 103454800 A | 12/2013 |
| CN | 103472966 A | 12/2013 |
| CN | 203706191 U | 7/2014 |
| CN | 104156129 A | 11/2014 |

OTHER PUBLICATIONS

Sep. 5, 2016—(CN)—First Office Action Appn 201410332397.4 with English Tran.
Mar. 9, 2017—(CN) Second Office Action Appn 201410332397.4 with English Tran.

* cited by examiner

TOUCH SUBSTRATE AND DISPLAY DEVICE

The application is a U.S. National Phase Entry of International Application No. PCT/CN2014/091905 filed on Nov. 21, 2014, designating the United States of America and claiming priority to Chinese Patent Application No. 201410332397.4 filed on Jul. 11, 2014. The present application claims priority to and the benefit of the above-identified applications and the above-identified applications are incorporated by reference herein in their entirety.

TECHNICAL FIELD

Embodiments of the present invention relate to a touch substrate and a display device.

BACKGROUND

With the development of technology, touch panels with touch control function have been applied more and more.

Capacitive touch panels become an important form of touch panels. As shown in FIG. 1, a capacitive touch panel comprises a plurality of touch driving electrodes Tx parallel to each other and a plurality of touch sensing electrodes Rx parallel to each other, which electrodes are all controlled by a control unit 100. The plurality of touch sensing electrodes Rx parallel to each other are disposed to overlap the touch driving electrodes Tx, thereby forming capacitors at the intersections between these two types of electrodes. As long as the driving electrodes are input with driving signals in order in scanning, sensing electrodes will generate respective sensing signals thereon correspondingly. When a touch action occurs, phenomena, such as electrode discharge, changes in the distances between electrodes, and changes in dielectric constants between electrodes, would appear at the touch point, and they can cause change of capacitance there. Thereby, when a driving electrode is scanned, the sensing signal over the sensing electrode corresponding to the touch point would also undergo change. In this way, it is possible to determine the touch position and implement touch control.

In order to reduce costs, reduce thickness and increase light transmittance, generally touch structures are converted more to the in-cell touch type. That is, the above-mentioned touch driving electrodes Tx and touch sensing electrodes Rx are disposed directly in the display panel, which means the touch panel itself can have both display function and touch function. For an in-cell touch panel, touch sensing electrodes Rx and touch driving electrodes Tx can also be used together with other electrodes for display so as to simplify the structure. For example, the above-mentioned touch driving electrodes Tx can also function as common electrodes (for liquid crystal display). In such a case, the touch panel needs to switch between display phases and touch phases alternatively, for example, entering a touch phase of 4 milliseconds each time after displaying one frame of picture. In this way, touch operation can not be implemented in the display phase, while display operation can not be implemented in a touch phase. However, since these two phases are switched very quickly, the user can not perceive it.

SUMMARY

Embodiments of the present invention provide a touch substrate and a display device that can effectively release charges accumulated on touch driving electrodes and/or touch sensing electrodes.

At least one embodiment of the present invention provides a touch substrate comprising a plurality of first electrodes for touch control, a plurality of first switching units and a control unit for controlling the first switching units; any two adjacent the first electrodes are connected through one of the first switching units and each of the first electrodes is connected with the control unit.

For example, the touch substrate further comprises a plurality of second electrodes for touch control, the plurality of second electrodes, the plurality of first electrodes are disposed to intersect and be insulated from each other, and each of the second electrodes is connected with the control unit.

For example, the touch substrate may further comprise a plurality of second switching units, any two adjacent the second electrodes are connected through one of the second switching units, and each of the second switching units is controlled by the control unit.

An embodiment of the present invention further provides a display device comprising any of the above-mentioned touch substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE NUMERALS

Figure 1:
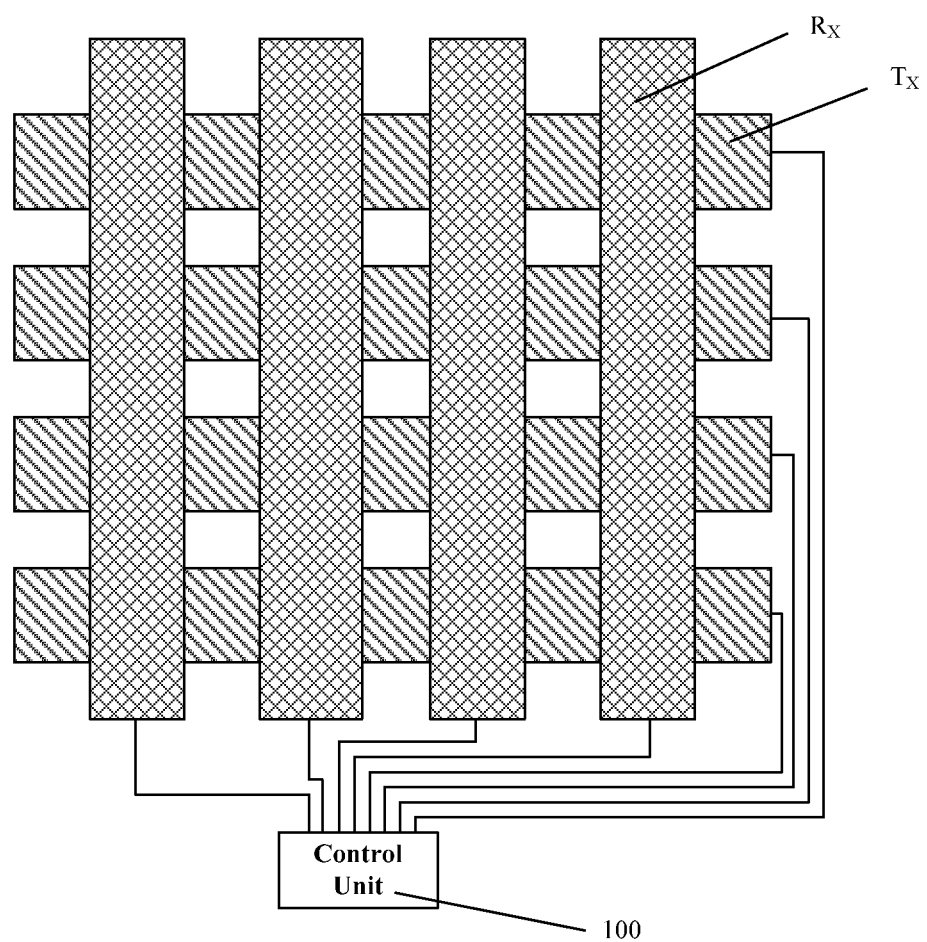
FIG. 1 is a structure diagram of a common touch substrate.

1, first switching unit; 2, second switching unit; 3, third switching unit; 100, control unit; Tx, touch driving electrode; Rx, touch sensing electrode; Am, first sub-electrode; L, connecting wire; 10, first electrode; 20, second electrode; 11, first terminal of first switching transistor; 12, second terminal of first switching transistor; 13, control electrode of first switching transistor; 21, first terminal of second switching transistor; 22, second terminal of second switching transistor; 23, control electrode of second switching transistor; 31, first terminal of third switching transistor; 32, second terminal of third switching transistor; 33, control electrode of third switching transistor.

DETAILED DESCRIPTION

In order to enable those skilled in the art to better understand the objects, technical schemes and advantages of embodiments of the present invention, the technical schemes of embodiments of the present invention will be further described in detail below with respect to accompanying drawings and specific implementations. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," "third" etc., which are used in the description and the claims of the present application for invention, are not intended to indicate any sequence, amount or importance, but distinguish various components.

The inventors have found in research that in the touch operation of an in-cell capacitive touch panel, due to frequent capacitance variations, charges tend to accumulate on touch driving electrodes Tx and/or touch sensing electrodes Rx. If these accumulated charges cannot be released, they are likely to result in touch insensitivity. When these electrodes are also multiplexed along with the structure used for display, the above-mentioned accumulated charges also cause display defects such as image artifacts in a display phase.

In the following description of the present disclosure, first electrodes 10 as touch driving electrodes and second electrodes 20 as touch sensing electrodes are described only for example. In practice, the first electrodes 10 may also be touch sensing electrodes, and accordingly the second electrodes 20 serve as touch driving electrodes. First terminals and second terminals of various switching transistors may also interchange as required. Further, it is also noted that first electrodes 10 and second electrodes 20 may be both disposed on the same substrate, or disposed on two different substrates respectively (for example, first electrodes 10 disposed on the array substrate of a liquid crystal panel, and second electrodes 20 disposed on the color filter substrate of the liquid crystal panel) as long as it is guaranteed that the first electrodes 10 and the second electrodes 20 intersect each other and are insulated from each other. In the following embodiments, description is given only with an example in which first electrodes 10 and second electrodes 20 are both disposed on the same substrate, however, the present invention is not limited thereto.

Embodiment 1

Figure 2:
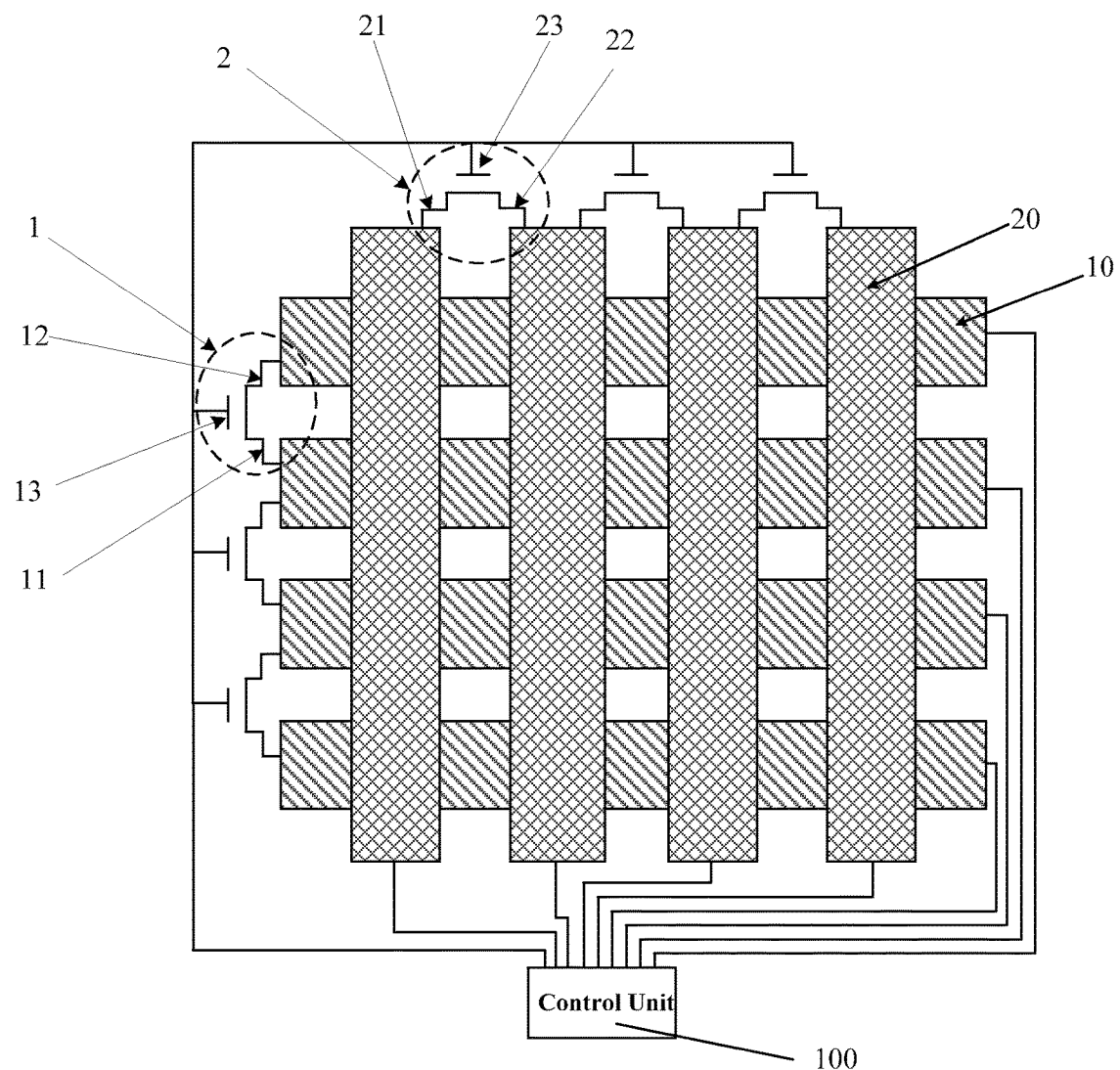
FIG. 2 is a schematic diagram of a touch substrate according to embodiment 1 of the present invention.

FIG. 2 shows a touch substrate comprising a plurality of first electrodes 10 for touching, a plurality of first switching units 1, and a control unit 100 for controlling first switching units 1. Any two adjacent first electrodes 10 are connected through one first switching unit 1 and each first electrode 10 is connected with the control unit 100.

For example, a plurality of second electrodes 20 intersecting and insulated from first electrodes 10 may be further disposed on the touch substrate and each second electrode 20 is connected with the control unit 100.

For example, the plurality of first electrodes 10 may be disposed parallel to each other, and the plurality of second electrodes 20 may also be disposed parallel to each other.

In the present embodiment, first electrodes 10 on the touch substrate serve as touch driving electrodes Tx, and second electrodes 20 serve as touch sensing electrodes Rx. The touch substrate of the present embodiment is applied in a touch panel, and the connection or disconnection of each touch sensing electrode Rx is controlled by input of switching signals to the first switching units 1 by the control unit 100. When the touch panel is in the touch mode, the first switching units 1 are turned off, and the touch driving electrodes Tx and the touch sensing electrodes Rx intersect each other and are insulated from each other; at the same time, the control unit 100 provides drive signals to touch driving electrodes Tx and sensing signals to touch sensing electrodes Rx, thereby mutual capacitances occur at intersections between touch driving electrodes Tx and touch sensing electrodes Rx. In this situation, if a finger touches the touch panel, some current will flow to the finger, which is equivalent to the variation of mutual capacitance, thereby resulting in variation of signals over touch sensing electrodes Rx, and with such variation it is possible to accurately detect the position of the finger touch. When the touch instruction is completed, the control unit 100 turns on the first switching units 1. Then, touch driving electrodes Tx are connected with each other to be an entirety. Therefore, in the touch phase, charges accumulated on a certain touch driving electrode Tx are distributed onto all the touch driving electrodes Tx connected with each other. It is possible to avoid or reduce interference with the electric field for display, which interference is caused by the charges accumulated on the certain touch driving electrode Tx, and in turn reduce or eliminate problems such as visual image artifacts and touch insensitivity caused by charges accumulated on the certain touch driving electrode Tx.

For example, the touch substrate of the present embodiment may further comprise a plurality of second switching units 2. Any two adjacent second electrodes 20 are connected through one second switching unit 2, and each second switching unit 2 is controlled by a control unit 100. In this situation, when the touch panel is in the touch mode, the first switching units 1 and the second switching units 2 are both turned off, the touch driving electrodes Tx and the touch sensing electrodes Rx intersect each other and are insulated from each other; at the same time, the control unit 100 provides drive signals to touch driving electrodes Tx and sensing signals to touch sensing electrodes Rx, thereby mutual capacitances occur at intersections between touch driving electrodes Tx and touch sensing electrodes Rx. In this situation, if a finger touches the touch panel, some current flow to the finger, which is equivalent to the variation of mutual capacitance, thereby resulting in variation of signals over touch sensing electrodes Rx, with which it is possible to accurately detect the position of the finger touch. When the touch instruction is completed, the control unit 100 turns on both the first switching units 1 and the second switching units 2. Then, touch driving electrodes Tx are connected with each other to be an entirety, and touch sensing electrodes Rx are connected with each other to be an entirety. Therefore, in the touch phase, charges accumulated on a certain touch driving electrode Tx and/or a certain touch sensing electrode Rx are distributed to all the touch driving electrodes Tx connected with each other and/or all touch sensing electrodes Rx connected with each other. It is possible to avoid or reduce interference with the electric field for display, which interference is caused by the charges accumulated on the certain touch driving electrode Tx and/or a touch sensing electrode Rx connected with each other, and in turn reduce or eliminate problems such as visual image artifacts and touch insensitivity caused by charges accumulated on a certain touch driving electrode Tx.

For example, in the present embodiment, the first switching units 1 may be first switching transistors. A first terminal 11 and a second terminal 12 of a first switching transistor are connected with two adjacent first electrodes 10 respectively. The control electrodes 13 of first switching transistors are shorted together and connected with the control unit 100.

For example, the second switching units 2 may be second switching transistors, a first terminal 21 and a second terminal 22 of a second switching transistor are connected with two adjacent second electrodes 20 respectively, and the control electrodes 23 of second switching transistors are shorted together and connected with the control unit 100. Of course, the first switching units 1 are not limited to first switching transistors, the second switching units 2 are not limited to second switching transistors, and both can be other switching devices such as triodes and field effect transistors.

Furthermore, for example, control electrodes 13 of first switching transistors are shorted with control electrodes 23 of second switching transistors and further connected with the control unit 100. After a touch instruction is completed, the control unit 100 turns on both the first switching transistors and the second switching transistors. Then, first electrodes 10 and second electrodes 20 are connected together as an entirety. In this situation, it is possible to more effectively release charges accumulated on a certain touch driving electrode Tx and/or a certain touch sensing electrode Rx in the touch phase to all the touch driving electrodes Tx connected with each other and/or all the touch sensing electrodes Rx connected with each other. It is possible to avoid or reduce interference with the electric field for display, which interference is caused by the charges accumulated on a certain touch driving electrode Tx and/or a touch sensing electrode Rx connected with each other, and in turn reduce or eliminate problems such as visual image artifacts and touch insensitivity caused by charges accumulated on a certain touch driving electrode Tx.

Furthermore, for example, both the first electrodes 10 (touch driving electrodes Tx) and the second electrodes 20 (touch sensing electrodes Rx) are common electrodes made of for example a transparent conductive material. After the touch mode, the control unit 100 turns on first switching units 1 and second switching units 2. In this situation, the touch driving electrodes Tx and the touch sensing electrodes Rx are connected together to form a common electrode as a whole, which can not only effectively release charges accumulated on a certain touch driving electrode Tx and/or a touch sensing electrode Rx in touch phase to the entire common electrode, but also will not introduce any delay to the display. Of course, first electrodes 10 (touch driving electrodes Tx) and second electrodes 20 (touch sensing electrodes Rx) may also be other metal wires, and before the touch panel enters the display phase, first switching units 1 and second switching units 2 are turned on to release charges accumulated on touch driving electrodes Tx and/or touch sensing electrodes Rx and then first switching units 1 and second switching units 2 are turned off for normal display.

Embodiment 2

Figure 3:
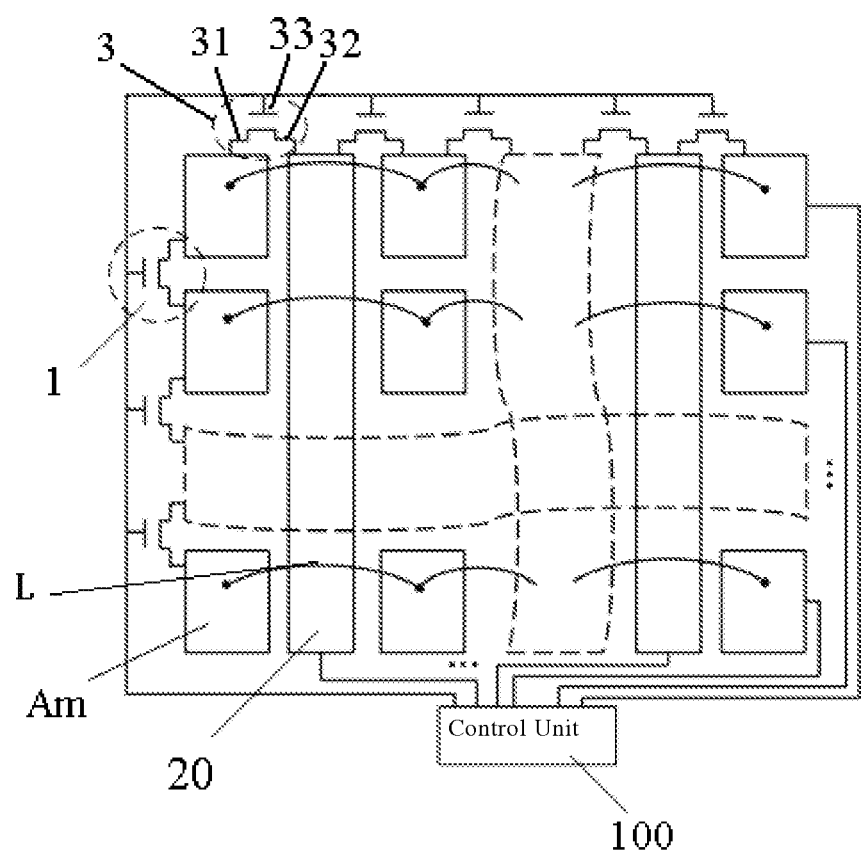
FIG. 3 is a schematic diagram of a touch substrate according to embodiment 2 of the present invention.

With the similar structure and identical principle to the touch substrate of embodiment 1, as shown in FIG. 3, another touch substrate provided in the present embodiment is different from embodiment 1 in structure in that one of the first electrodes 10 and the second electrodes 20 are of a segmental structure while the other are of a continuous structure. For example, each first electrode 10 (touch driving electrode Tx) of the present embodiment may comprise a plurality of first sub-electrodes Am, which are disposed alternatively, and connecting wires L for connecting any two adjacent first sub-electrodes Am. For example, the connecting wires L may be of metal wires.

For example, second electrodes 20 (touch sensing electrodes Rx) may be disposed to intersect and be insulated from connecting wires L. For example, the first sub-electrodes Am of the first electrodes 10 and the second electrodes 20 are disposed on the same layer and connecting wires L are disposed on another layer and connected with corresponding first sub-electrodes Am through for example via holes or by direct tap-joint.

For example, in the present embodiment, the first switching units 1 may be first switching transistors; a first terminal 11 and a second terminal 12 of a first switching transistor are connected with first sub-electrodes Am comprised in two adjacent first electrodes 10 respectively such that any two adjacent first electrodes 10 are connected through a first switching unit, and the control electrodes 13 of first switching transistors are shorted together and connected with the control unit 100.

For example, in the present embodiment, first sub-electrodes Am in touch driving electrodes Tx may be interconnected with connecting wires L through via holes, and connecting wires L and touch sensing electrodes Rx constitute a sensing bridge and generate mutual capacitance. The operation principle of the touch substrate of this structure is the same as that of the touch substrate of embodiment 1.

For example, in the present embodiment, third switching units 3 are further provided and may be third transistors. A second electrode 20 is connected with an adjacent first sub-electrode, such as the first sub-electrode in the first electrode 10 of the first row on the top side in FIG. 3, through a third switching unit 3. As shown in FIG. 3, a first terminal 31 of a third switching transistor 3 is connected with a first sub-electrode Am (thereby with the corresponding first electrode 10), a second terminal 32 is connected with a second electrode 20, and control electrodes 33 of the third switching transistors are shorted together and connected with the control unit 100. When a third switching transistor 3 is turned on, a first sub-electrode Am connected therewith and a second electrode 20 will be shorted.

For example, both the first electrodes 10 (touch driving electrodes Tx) and the second electrodes 20 (touch sensing electrodes Rx) may be common electrodes made of for example a transparent conductive material.

Since the operation principle of the present embodiment is the same as that of embodiment 1 except that the structure of first electrodes 10 of the touch substrate is different from that of embodiment 1, the operation principle of applying the touch substrate to a touch panel will not be repeated any more here.

Embodiment 3

The present embodiment provides a display device comprising any of the touch substrates in the above-mentioned embodiments. The display device may be any product or component with display function such as a liquid crystal display panel, a piece of electronic paper, an OLED panel, a cellphone, a slab computer, a TV set, a display, a notebook computer, a digital picture frame, a navigator, and a watch.

Since the display device of the present embodiment comprises any one of the touch substrates in the above-mentioned embodiments, it is possible to avoid or reduce interference with an electric field for display, which interference is caused by charges accumulated on a certain touch driving electrode Tx and/or a touch sensing electrode Rx connected with other, thereby reducing or eliminating problems such as visual image artifacts and touch insensitivity caused by charges accumulated on a certain touch driving electrode Tx.

What are described above is related to the illustrative embodiments of the disclosure only and not limitative to the scope of the disclosure; the scopes of the disclosure are defined by the accompanying claims.

The present application claims priority of Chinese patent application No. 201410332397.4 filed on Jul. 11, 2014, the content of which is incorporated in its entirety as part of the present application by reference herein.

The invention claimed is:

1. A touch substrate, comprising: a plurality of first electrodes for touch control, a plurality of first switching units, a control unit for controlling the first switching units, a plurality of second electrodes for touch control, and a plurality of second switching units, wherein
any two adjacent the first electrodes are connected through one of the first switching units and each of the first electrodes is connected with the control unit,
wherein any two adjacent the second electrodes are connected through one of the second switching units, and each of the second switching units is controlled by the control unit, and
wherein the second switching units are second switching transistors, a first terminal and a second terminal of each of the second switching transistors are respectively connected with two adjacent second electrodes, and control electrodes of the second switching transistors are shorted together and connected with the control unit.

2. The touch substrate according to claim 1, wherein the plurality of second electrodes and the plurality of first electrodes are disposed to intersect and be insulated from each other, and each of the second electrodes is connected with the control unit.

3. The touch substrate according to claim 2, wherein the plurality of first electrodes are disposed parallel to each other, and the plurality of second electrodes are disposed parallel to each other.

4. The touch substrate according to claim 1, wherein the first switching units are first switching transistors,
a first terminal and a second terminal of each of the first switching transistors are connected with two adjacent first electrodes, and control electrodes of the first switching transistors are shorted together and connected with the control unit.

5. The touch substrate according to claim 1, wherein the first switching units are first switching transistors, a first terminal and a second terminal of each of the first switching transistors are connected with two adjacent first electrodes respectively;
control electrodes of the first switching transistors are shorted with control electrodes of the second switching transistors and connected with the control unit.

6. The touch substrate according to claim 2, wherein each of the first electrodes comprises a plurality of first sub-electrodes disposed to be separated from each other and connecting wires each for connecting two adjacent first sub-electrodes.

7. The touch substrate according to claim 6, wherein the second electrodes and the connecting wires are disposed to intersect and insulated from each other.

8. The touch substrate according to claim 6, further comprising a plurality of third switching units, wherein, one of the second electrodes is connected with an adjacent one of the first sub-electrodes through one of the third switching units, and the third switching units are shorted together and are controlled by the control unit.

9. The touch substrate according to claim 8, wherein the third switching units are third switching transistors,
a first terminal of each third switching transistor is connected with one of the first sub-electrodes, a second terminal of the third switching transistor is connected with one of the second electrodes, and control electrodes of third switching transistors are shorted together and connected with the control unit.

10. The touch substrate according to claim 9, wherein the first switching units are first switching transistors, a first terminal and a second terminal of each of the first switching transistors are connected with the first sub-electrodes of two adjacent first electrodes respectively, and control electrodes of the first switching transistors are shorted together and connected with the control unit.

11. The touch substrate according to claim 10, wherein the control electrodes of the first switching transistors are shorted with the control electrodes of the third switching transistors and connected with the control unit.

12. The touch substrate according to claim 2, wherein both the first electrodes and the second electrodes are common electrodes.

13. A display device comprising the touch substrate of claim 1.

14. The touch substrate according to claim 2, wherein the first switching units are first switching transistors,
a first terminal and a second terminal of each of the first switching transistors are connected with two adjacent first electrodes, and control electrodes of the first switching transistors are shorted together and connected with the control unit.

15. The touch substrate according to claim 3, wherein each of the first electrodes comprises a plurality of first sub-electrodes disposed to be separated from each other and connecting wires each for connecting two adjacent first sub-electrodes.

16. The touch substrate according to claim 15, wherein the second electrodes and the connecting wires are disposed to intersect and insulated from each other.

17. The touch substrate according to claim 15, further comprising a plurality of third switching units, wherein,
one of the second electrodes is connected with an adjacent one of the first sub-electrodes through one of the third switching units, and the third switching units are shorted together and are controlled by the control unit.

18. The touch substrate according to claim 17, wherein the third switching units are third switching transistors,
a first terminal of each third switching transistor is connected with one of the first sub-electrodes, a second terminal of the third switching transistor is connected with one of the second electrodes, and control electrodes of third switching transistors are shorted together and connected with the control unit.

* * * * *